US005388558A

United States Patent [19]

Plapp et al.

[11] Patent Number: 5,388,558

[45] Date of Patent: Feb. 14, 1995

[54] METHOD AND ARRANGEMENT FOR CHECKING THE OPERABILITY OF A FLUID-FLOW CONDUCTING CONDUIT SYSTEM OF AN INTERNAL COMBUSTION ENGINE

[75] Inventors: Günther Plapp, Filderstadt; Robert Entenmann, Benningen; Alfred Kratt, Schwieberdingden, all of Germany

[73] Assignee: Robert Bosch GmbH, Stuttgart

[21] Appl. No.: 52,068

[22] Filed: Apr. 22, 1993

[30] Foreign Application Priority Data

Apr. 22, 1992 [DE] Germany ............................ 4213173

[51] Int. Cl.$^6$ ...................... G01M 15/00; F02M 33/02

[52] U.S. Cl. ...................................... 123/520; 123/571

[58] Field of Search ....................... 123/571, 520, 676; 73/25.01

[56] References Cited

U.S. PATENT DOCUMENTS 4,962,744 10/1990 Uranishi et al. ...................... 123/520
4,967,717 11/1990 Miyazaki et al. ................... 123/571
4,974,572 12/1990 Aramaki .............................. 123/571
5,243,944 9/1993 Blumenstock ....................... 123/520

*Primary Examiner*—E. Rollins Cross
*Assistant Examiner*—Thomas N. Moulis
*Attorney, Agent, or Firm*—Walter Ottesen

[57] ABSTRACT

The invention is directed to a method for checking the operability of a conduit system conducting a fluid flow. The conduit system is for an internal combustion engine and utilizes two fluids having temperatures which are different from each other. In this way, it is possible to set quite well-defined measuring conditions. The fluid flow in the conduit system to be checked is coupled to the temperature sensor in such a manner that the temperature thereof changes with a relatively steep gradient when, starting at a specific time point, the above-mentioned fluid operates to warm the temperature sensor. When the magnitude of the gradient remains below a threshold value, the conduit system checked is evaluated to be operational. The measurement is reliable even though it requires only a single temperature sensor.

12 Claims, 4 Drawing Sheets

METHOD AND ARRANGEMENT FOR CHECKING THE OPERABILITY OF A FLUID-FLOW CONDUCTING CONDUIT SYSTEM OF AN INTERNAL COMBUSTION ENGINE

FIELD OF THE INVENTION

The invention relates to a method and an arrangement for checking the operability of a fluid-flow conducting conduit system for an internal combustion engine. The fluid can be a gas such as returned exhaust gas or gas from a tank-venting system or the fluid can be a liquid such as cooling water or oil for a servo unit.

BACKGROUND OF THE INVENTION

In the following, inoperability is not necessarily to be understood as being a complete malfunction of the conduit system checked; instead, any state is so understood in which the conduit system is no longer completely operable.

U.S. Pat. No. 4,967,717 discloses mounting a temperature sensor in a return conduit for checking the operability of an exhaust-gas return conduit system. When an exhaust-gas return valve is opened, hot exhaust gas brushes over a temperature sensor whereupon the sensor is warmed. The sensor cools down again when the exhaust-gas flow is interrupted by closing the valve. If the valve is again driven so that it opens but no warming of the sensor is determined, this shows that either the valve no longer opens or the conduit system is obstructed or there is a leak forward of the location at which the sensor is mounted. The temperature of the sensor is not only dependent upon the temperature of the exhaust gas but also on the ambient temperature. For this reason, the arrangement presented in U.S. Pat. No. 4,967,717 includes a second temperature sensor for detecting the temperature of the ambient air. A threshold temperature is modified with the aid of the ambient temperature measured in this way and the temperature of the first temperature sensor is compared to the modified threshold temperature. If the temperature of the first sensor remains below the threshold temperature, then the exhaust-gas return conduit system is determined to be no longer operational.

U.S. Pat. No. 4,962,744 describes a method and an arrangement for checking the operability of the conduit system of a tank-venting system with the aid of a temperature sensor. The temperature sensor is mounted in an adsorption filter within the conduit system. If the system is operational, then the adsorption filter must adsorb fuel vapor when certain operating conditions are present; and, desorption must occur for other operating conditions. The adsorption is related to a temperature increase; whereas, the desorption leads to a reduction of the temperature of the sensor. The difference of the temperatures is formed as they are present for adsorption conditions and/or desorption conditions. The system is determined to be non-operational when this difference remains below a threshold value.

A disadvantage of the first-mentioned arrangement and of the method corresponding thereto is that two temperature sensors are needed. The arrangement is therefore relatively complex. A disadvantage of the second-mentioned arrangement and the method corresponding thereto is that a check is possible only for very specific operating conditions, the presence of which must be detected with special detectors. The second arrangement is therefore also complex. Furthermore, this arrangement has the disadvantage that it can be carried out only infrequently, namely, when the very specific operating conditions are present.

SUMMARY OF THE INVENTION

In view of the foregoing, it is an object of the invention to provide a method and an arrangement for checking the operability of a fluid-flow conducting conduit system for an internal combustion engine which is characterized by simplicity but yet is reliable.

The method of the invention and the arrangement of the invention are first considered in the context of an exhaust-gas return conduit system which is so coupled to a tank-venting conduit system that one conduit section is common to both conduit systems. The temperature sensor is mounted in this common conduit section. First, the case is assumed that the exhaust-gas return conduit system is to be checked as to operability. In this case, the temperature sensor is brought to a low temperature with the aid of the tank-venting gas flow. The tank-venting gas flow is then switched off and return exhaust gas is passed by the temperature sensor. The temperature of this temperature sensor is then increased and the gradient of this temperature increase is measured. If the gradient exceeds a pregiven threshold value, then the exhaust-gas return conduit system is determined to be operational. For a second variation, the assumption is made that the tank-venting conduit system is to be checked for operability. In this case, the temperature sensor is brought to a relatively high temperature with the aid of the returned exhaust gas. Then, the flow of returned exhaust gas is interrupted and, in lieu thereof, cool gas from the tank-venting system is passed over the temperature sensor. The temperature sensor is accordingly reduced in temperature and the gradient of the temperature reduction is measured. If the measured gradient remains below the pregiven threshold value, then the tank-venting system is determined to be non-operational.

This method and the arrangement corresponding thereto having the temperature sensor common to the two conduit systems is characterized in that very significant effects can be measured since two gas flows having two very different temperatures are brought to bear on the temperature sensor. Fluctuations in the absolute temperatures of the two gas flows operate in a manner which does not greatly influence the result of the evaluation.

If very sensitive determinations are made or if even a gas-flow rate is to be measured quantitatively, then it is advantageous that the method and/or the arrangement is so modified that the measuring operation starts at a pregiven temperature. In the above-mentioned example, this can take place pursuant to the method in that a temperature is fixed as the start temperature which is somewhat above the temperature which the gas at the lower temperature can have as a maximum when the exhaust-gas return conduit system is to be evaluated or such a temperature which lies somewhat below the temperature which the hotter gas can have as a minimum when the tank-venting conduit system is to be evaluated.

The same effect can be obtained with the arrangement in that the temperature sensor is heat coupled in an excellent manner to the first fluid in the conduit system to be checked and is poorly coupled to the second fluid. In this case, the sensor therefor is no longer mounted in a common conduit section; instead, the sensor is mounted between two conduit sections with the above-mentioned coupling conditions being maintained. A fluid having a rather constant temperature is used as the second fluid, for example, cooling water which has a temperature which is rather precise at 100° C. for average engine powers. If the temperature sensor is maintained in heat contact with the second fluid for a longer time, then the temperature sensor takes on the temperature of the fluid notwithstanding the poor coupling. If the first fluid is then allowed to flow through the conduit system to be checked, for example, the tank-venting gas which is significantly cooler, then the temperature sensor cools down rapidly because of the good heat coupling to this first fluid provided that the tank-venting conduit system is operational. If hot exhaust gas in an exhaust-gas return conduit system is used in lieu of the cool tank-venting gas, then the temperature sensor is rapidly heated because of the good coupling rather than being cooled down rapidly. The exhaust-gas return conduit system is determined to be operational if the gradient of this warming lies above a threshold value.

The above examples show that different fluids can be used for the two fluid flows, for example, two gases or a gas and a liquid or even two liquids. The fluids can be conducted alternately through a conduit section which is common to the two conduit systems or the fluids can be conducted through different conduit sections in which case the temperature sensor is coupled to the two conduit sections. In the coupling case, the fluids can either be conducted in time sequence through the section corresponding thereto or the fluid in the conduit system which is not checked can be coupled with a poor heat coupling to the sensor; whereas, the fluid in the conduit system to be checked is coupled well to the sensor. What is essential for the method of the invention and for the arrangement of the invention is only that a single temperature sensor is used on which two fluids of different temperature operate with the fluid in the conduit system to be checked being caused to suddenly act on the temperature sensor by means of a control configured for this purpose in order to determine the operability of the conduit system checked with the aid of the temperature change effected thereby.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
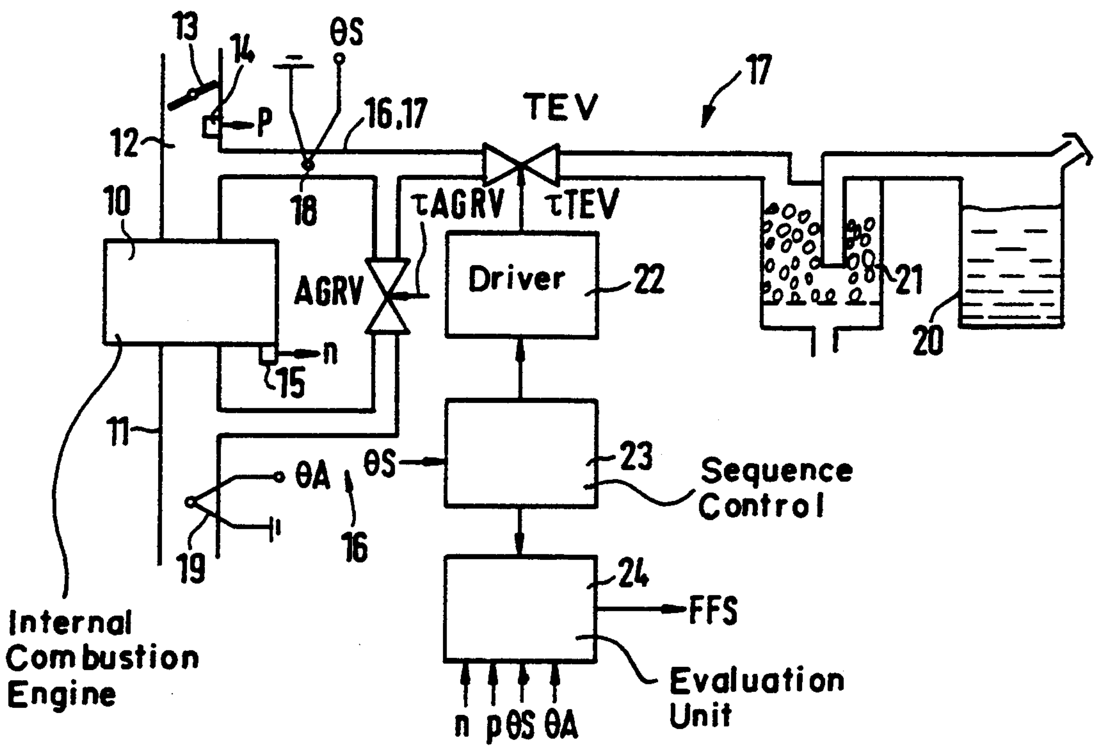
FIG. 1 is a block circuit diagram of an internal combustion engine and an arrangement for checking the operability of an exhaust-gas return conduit system of the engine.

The internal combustion engine 10 shown schematically in FIG. 1 includes an exhaust-gas pipe 11 and an intake pipe 12 in which a throttle flap 13 and a pressure sensor 14 are mounted for measuring the intake pressure (p). The engine speed (n) of the engine is detected with the aid of an rpm-sensor 15. An exhaust-gas return conduit system 16 and a tank-venting system 17 coact with the engine 10. The two systems 16 and 17 have a common conduit section 16/17 which opens into the intake pipe 12. A temperature sensor 18 is mounted in this common section 16/17. A second temperature sensor, namely, an exhaust-gas temperature sensor 19 is mounted in the exhaust-gas pipe 11.

At this point, it is noted that the intake pressure (p) and the exhaust-gas temperature ($\theta$A) must not necessarily be measured; instead, they can be computed from models into which special parameters are inputted such as the throttle flap position and the engine speed for the intake pressure or injection times, the engine speed and the ignition time point data to determine the exhaust-gas temperature.

The tank-venting conduit system 17 includes a fuel tank 20, an adsorption filter 21 and a tank-venting valve TEV. This valve is driven at a pulse-duty factor $\tau$TEV by a driver 22 which also drives an exhaust-gas return valve AGRV with a pulse-duty factor $\tau$AGRV. The exhaust-gas return valve AGRV is mounted in the exhaust-gas return conduit system 16.

The arrangement shown in FIG. 1 for checking the operability of an exhaust-gas return conduit system includes, in addition to the above-mentioned driver 22, a sequence control 23 which defines a control unit together with the driver and an evaluation unit 24 which emits an operability signal FFS. The evaluation unit 24 receives signals as to the engine speed (n), intake pressure (p), temperature $\theta$S from the temperature sensor 18 and exhaust-gas temperature $\theta$A. If the evaluation unit 24 is so configured that it executes the method pursuant to the flowchart of FIG. 4, then the evaluation unit in addition receives a signal as to the pulse-duty factor $\tau$AGRV by means of which the degree of opening of the exhaust-gas return valve AGRV can be set.

Figure 2:
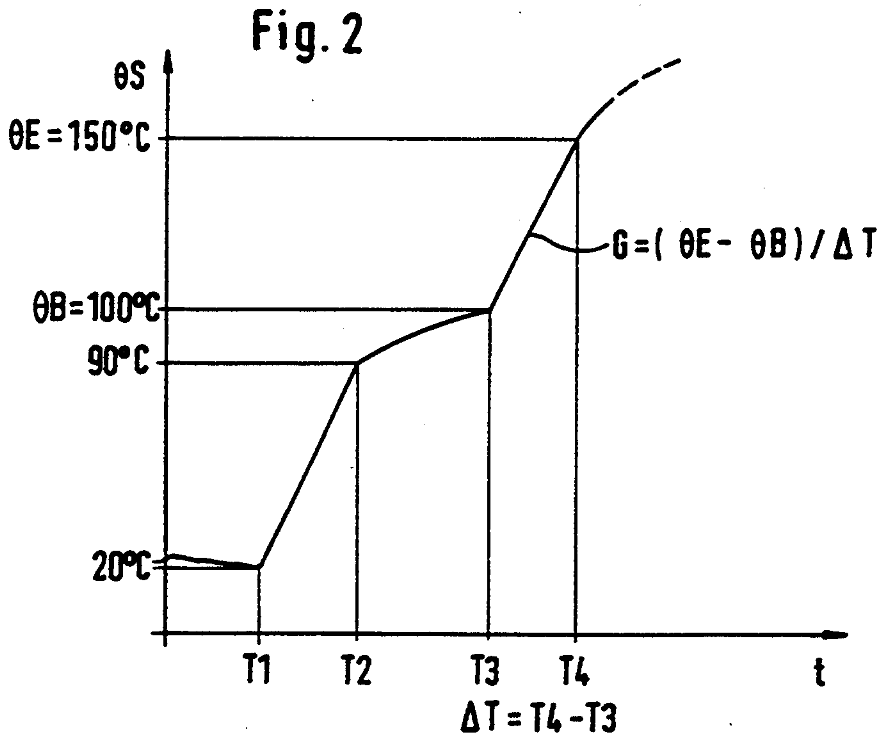
FIG. 2 is a diagram for explaining the method which is executed with the aid of the arrangement of FIG. 1.

With reference to FIG. 2, it will now be shown how the operability of the exhaust-gas return conduit system 16 is checked. According to this method, the gas flowing through the adsorption filter 21 is first permitted to flow through the common conduit system section 16/17. For this purpose, the tank-venting valve TEV is correspondingly opened while the exhaust-gas return valve is closed. A temperature of, for example 20° C., is then present at a time point T1. However, measurements are to be made only starting at a quasi stead-state start temperature $\theta$B of 100° C. For this purpose, the tank-venting valve TEV is closed at the time point T1 and the exhaust-gas return valve AGRV is opened. Then, in lieu of the cool gas from the adsorption filter, hot return exhaust gas flows through the common conduit section 16/17 and, for this reason, the temperature $\theta$S measured by the temperature sensor 18 increases.

This temperature is evaluated by the sequence control 23. If, at a time point T2 and at a temperature of 90° C., the sequence control 23 determines that the exhaust-gas return valve AGRV should be closed in view of an anticipated after-heat effect when the start temperature $\theta$B is not to be exceeded, then the sequence control 23 causes this closure to take place at time point T2.

According to FIG. 2, the temperature $\theta$S just reaches the temperature $\theta$B because of the above-mentioned after-heating effect which is the case at time point T3. If the temperature $\theta$B is not reached within a pregiven time span after the time point T2, then the sequence control 23 opens the exhaust-gas return valve AGRV once again in order to reach the pregiven start temperature $\theta$B. If in contrast, an increasing temperature gradient above a threshold value is determined when reaching the start temperature $\theta$B, then the implementation of further measures is delayed until the temperature $\theta$B is again reached via cool-down. Further measures are undertaken starting at a time point T3 only when, at this time point, the temperature $\theta$B is present and there is a drop below a pregiven temperature gradient. The temperature $\theta$B is then present as quasi steady-state. If this is the case then, starting at time point T3, the exhaust-gas return valve AGRV is again opened and, for this reason, the temperature $\theta$S again increases starting at the time point T3. The increasing temperature is monitored and a measurement is made of the time span $\Delta$T until an end temperature $\theta$E of 150° C. is reached at a time point T4. The quantity ($\theta$E-$\theta$B)/$\Delta$T is used as a temperature gradient G. If this temperature gradient lies above a threshold value, then the exhaust-gas return conduit system 16 is determined to be operational. Otherwise, it is inoperable. Inoperability can be caused by the following: an exhaust-gas return valve AGRV which opens unreliably; an obstruction of the exhaust-gas return conduit system 16; or, a hole in this conduit system. In all cases, an adequate amount of exhaust gas is no longer drawn by suction over the temperature sensor 18 in order to cause a warming at the minimum gradient in accordance with the above-mentioned threshold value.

Figure 3:
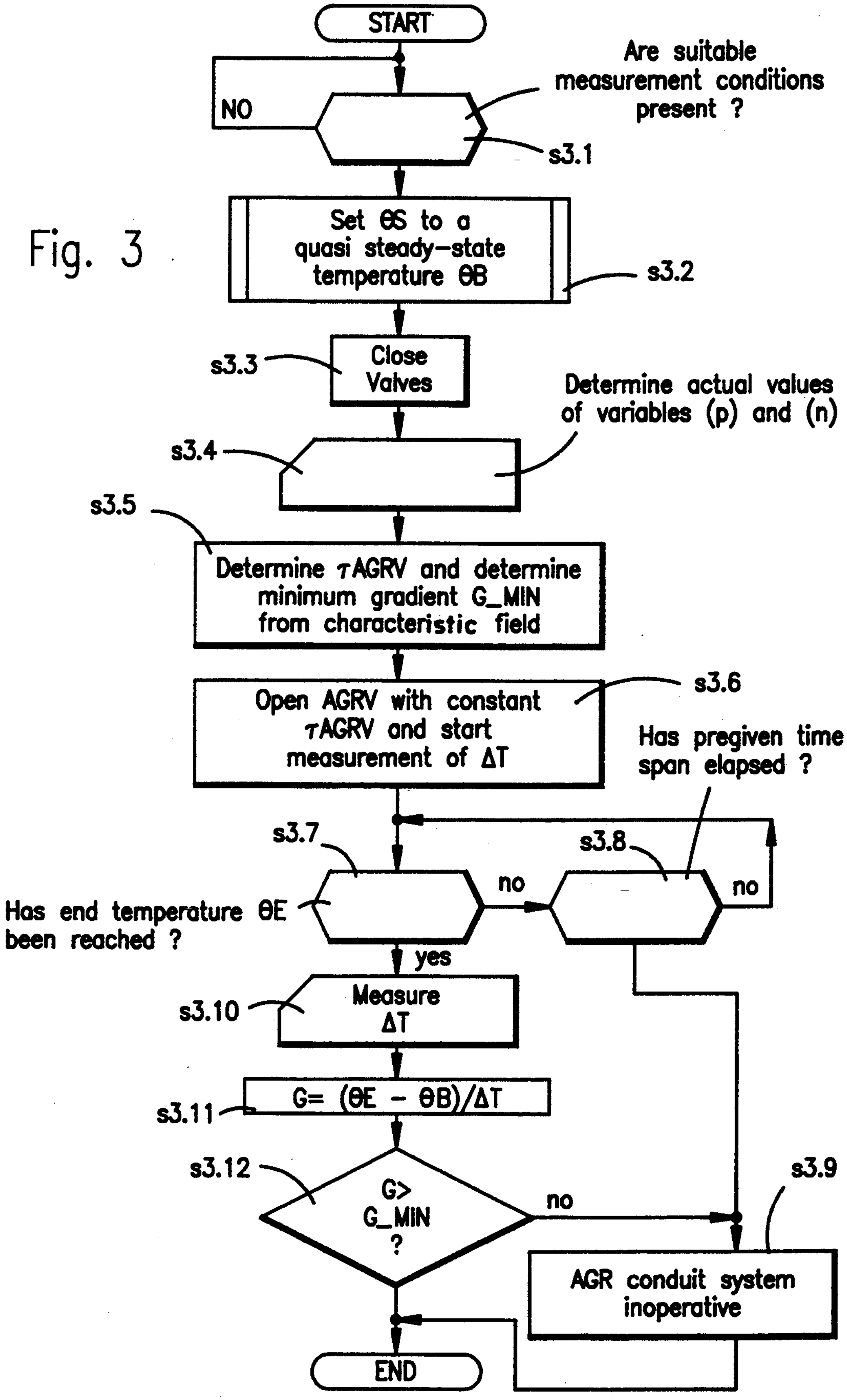
FIG. 3 is a flowchart of explaining the method shown in FIG. 2.

The method explained with respect to FIG. 2 is defined by the flowchart of FIG. 3. A check is made in a step s3.1 as to whether suitable measurement conditions are present. The matter of concern here is typically a mid-load range of the internal combustion engine 10. In the high-load range, the disadvantage is present that the intake pressure is relatively high so that only little gas is drawn through the common conduit section 16/17 which leads to unreliable effects. At low load, the problem is present that gas flows which flow through the common conduit section 16/17 into the engine 10 greatly influence the performance of the engine.

If suitable measurement conditions are present in step s3.1, then the start temperature $\theta$B is set in the manner explained with respect to FIG. 2 in a subprogram sequence s3.2. Then (step s3.3), all valves are closed and the actual values of the variables (p) and (n) are measured (step s3.4). With the aid of these values and a value for the actual pulse-duty factor, which is to be adjusted, a minimum gradient GMIN is determined from a characteristic field (step s3.5). The pulse-duty factor $\tau$AGRV is dependent upon values of operating variables. Thereafter (step s3.6), the exhaust-gas return valve AGRV is opened with the above-mentioned pulse-duty factor $\tau$AGRV and the measurement of the time span $\Delta$T is started. A check is now made (step s3.7) as to whether the end temperature $\theta$E is reached. If this temperature is not reached, then a check is made (step s3.8) as to whether a pregiven time span has elapsed. If this time span has elapsed, then an indication is provided in a step s3.9 that the exhaust-gas return conduit system is inoperable whereupon the end of the method is reached. If in contrast, the time span has not elapsed, then step s3.7 is again reached. If the situation finally occurs after running through the loop of the steps s3.7 and s3.8 that the end temperature is present, then the time span $\Delta$T is measured in a step s3.10. Thereafter (step s3.11), the gradient G is formed in the manner described above. In a step s3.12, a check is made as to whether the gradient G lies above the minimum gradient GMIN. If this is the case, then the end of the method is reached. Otherwise, an indication as to inoperability is provided in step s3.9 already mentioned.

At this point, it is noted that the arrangement of FIG. 1 is easily modified so that the operability of the tank-venting conduit system 17 is checked in lieu of the operability of the exhaust-gas return conduit system 16.

For this purpose, the sequence controlled by sequence control 23 is so modified that the functions of the tank-venting valve and of the exhaust-gas return valve are interchanged. Accordingly, a relatively high start temperature $\theta$B is first adjusted with the aid of the returned exhaust gas and then the tank-venting valve TEV is opened in order to allow cold gas from the adsorption filter 21 to pass over the temperature sensor 18. In lieu of an increasing temperature gradient, a falling temperature gradient is now checked as to whether it is greater in magnitude than a desired value. If this is the case, then the tank-venting conduit system 17 is operational.

The arrangement can also be so configured that it carries out both of the above-mentioned testing methods sequentially. In all cases, it is not necessary that one proceeds from a precisely determined start temperature $\theta$B; however, this increases the measurement accuracy. For example, one could proceed from the temperature which is present at time point T1 in the diagram of FIG. 2 when checking the exhaust-gas return conduit system. The gradient measurement according to the above-described sequences is always more precise than the absolute temperature measurement according to the known method as described, for example, in U.S. Pat. No. 4,962,744 referred to above.

Figure 4:
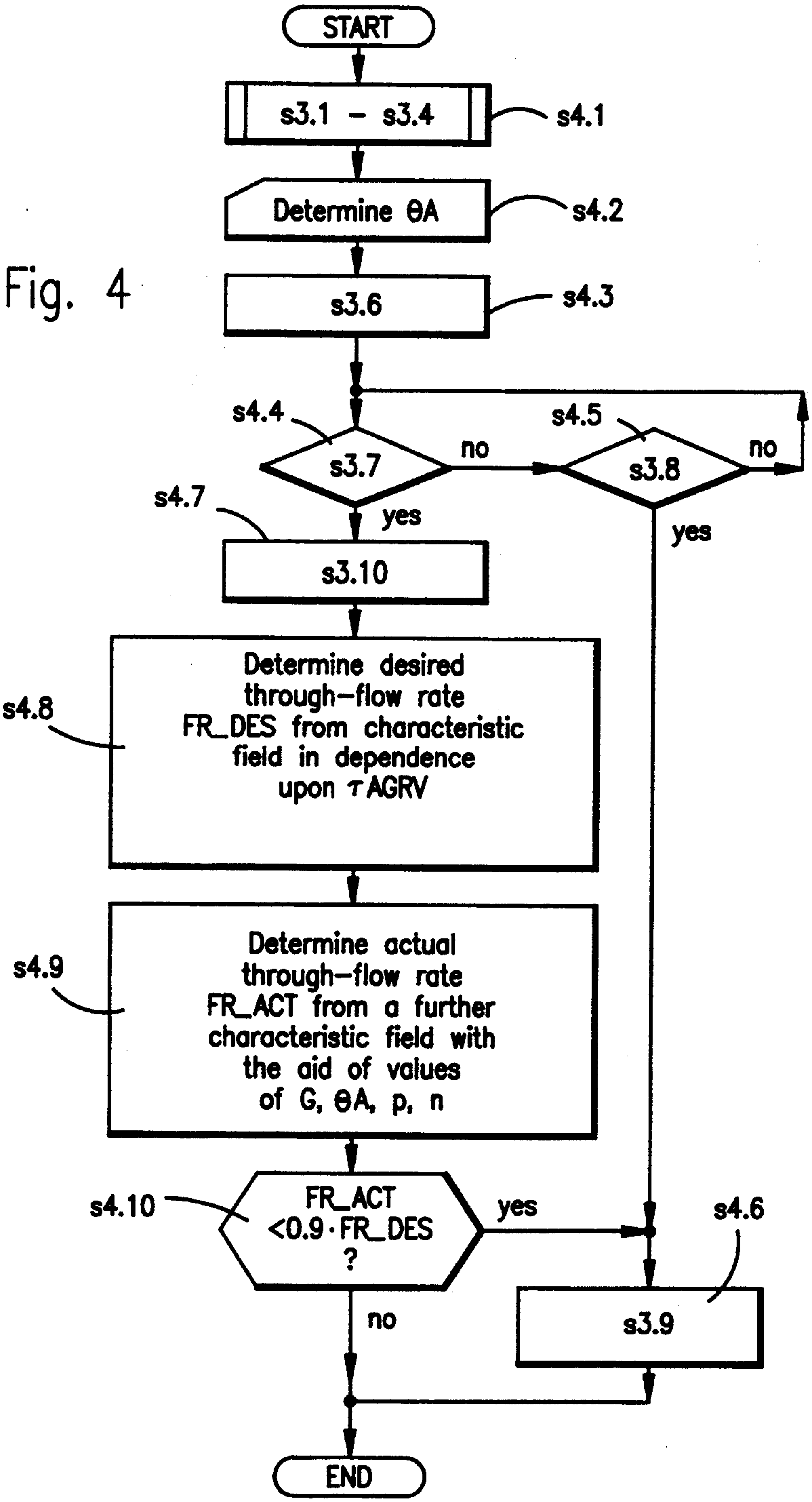
FIG. 4 is a flowchart of another embodiment of a method which operates similar to that shown in FIG. 3.

The flowchart of FIG. 4 shows a method which is different in two respects from that shown in FIG. 3. Firstly, as a variable dependent upon the temperature gradient T, this gradient itself is not used; rather, the flow rate of the returned exhaust gas through the common conduit section 16/17 is used. Secondly, the exhaust-gas temperature $\theta$A is measured which leads to an exceptionally precise detection of the through-flow rate just mentioned above. As explained further above, the exhaust-gas temperature can be derived with good precision from a model in lieu of measuring the same. If the exhaust-gas temperature sensor 19 is used to determine the exhaust-gas temperature, then this has the disadvantage that this sensor 19 is required as a second temperature sensor in addition to the temperature sensor 18 for detecting the temperature in the common conduit section 16/17; however, the advantage is provided that the measurement of the through-flow rate through the above-mentioned section can be made which would be possible only with measurement accuracy which is completely unreliable with the known absolute temperature measuring system according to U.S. Pat. No. 4,962,744.

The sequence of FIG. 4 starts with a subprogram step s4.1 having a content corresponding to steps s3.1 to s3.4. In step s4.2, the exhaust-gas temperature $\theta A$ is determined. Steps s4.3 to s4.7 then follow which correspond to the steps s3.6 to s3.10. In a step s4.8, a desired through-flow rate FRDES is determined from a characteristic field in dependence upon the pulse-duty ratio $\tau$AGRV determined in step s4.1 (more specifically, step s3.4) and the intake pressure (p). In a step s4.9, an actual through-flow rate FRACT is determined from a further characteristic field with the aid of the values of the variables G, $\theta A$, (p), (n). Then (step s4.10), a check is made as to whether the actual value is less than 0.9·FRDES. If this is the case, then a step s4.6 follows; otherwise, the end of the method is reached.

The method described with respect to FIG. 4 can easily be simplified in that only those steps are retained which are concerned with the determination of the through-flow rate FRACT. A very precise method for determining the through-flow rate is then provided.

Figure 5A:
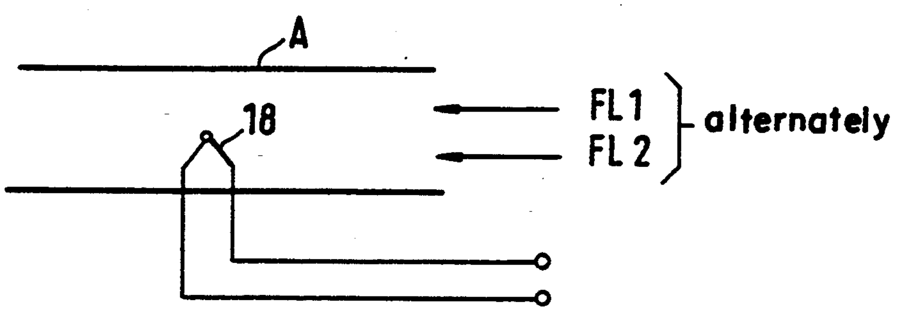
FIG. 5*a* is a schematic arrangement of a temperature sensor and two conduit systems wherein the temperature sensor is arranged in a section common to the two conduit systems.
Figure 5B:
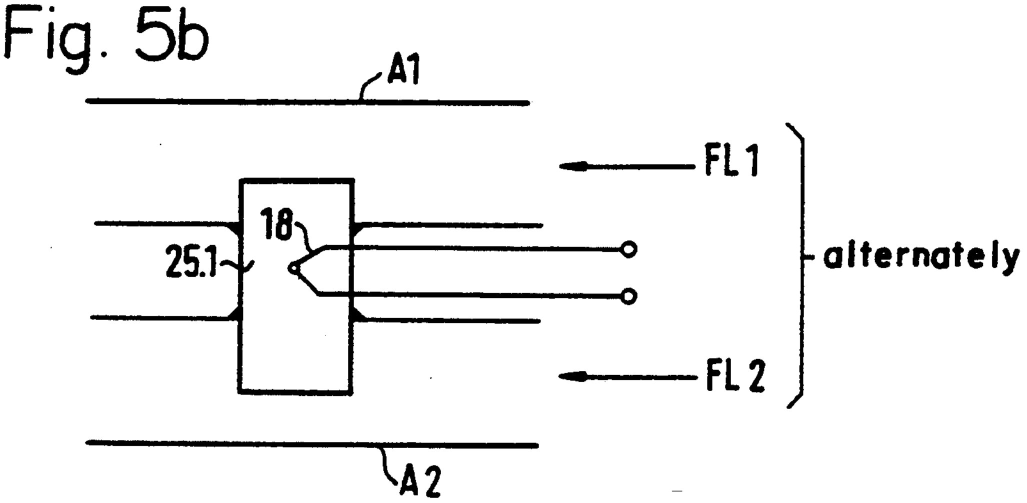
FIG. 5*b* is an arrangement of a temperature sensor and two conduit systems wherein the temperature sensor is connected to a first fluid in a first conduit system and a second fluid in a second conduit system with a heat coupling which is the same for both systems; and, FIG. 5*c* is a schematic of an arrangement of a temperature sensor and two conduit systems wherein the temperature sensor is connected to the fluid in the conduit system to be checked with a good heat coupling and is connected to a fluid in a second conduit system with a poor heat coupling.
Figure 5C:
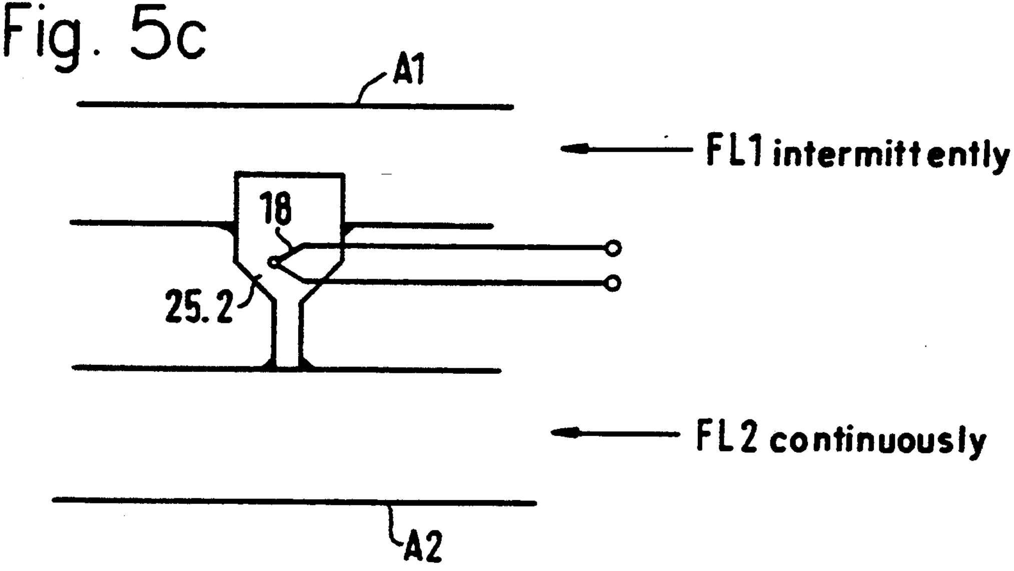

FIGS. 5*a* to 5*c* show different variations as to how two fluid flows FL1 and FL2 can operate on a temperature sensor 18.

FIG. 5*a* relates to the case of FIG. 1 wherein the temperature sensor 18 is mounted in a conduit segment A (corresponding to the conduit segment 16/17 of FIG. 1) used in common for both fluids. The fluids relate to a cooler gas FL1 and a warmer gas FL2. The warmer gas can be return exhaust gas. The cooler gas can, for example, be gas from a tank-venting system or gas in an idle bypass conduit system. A valve corresponding to the tank-venting valve in the tank-venting system of FIG. 1 is provided in such a bypass so that it is possible in a simple manner to alternately conduct the two fluid flows over the temperature sensor 18.

In the embodiment of FIG. 5*b*, the fluid FL1 is directed through a section A1 of a first conduit system and the fluid FL2 is conducted through a section A2 of a second conduit system. The temperature sensor 18 is mounted on a coupling mechanism 25.1 such as a copper plate which is coupled to both fluid flows equally well. The copper plate 25.1 is configured in the same manner with respect to both conduit sections A1 and A2 if fluids of the same kind are conducted through these sections such as a gas in each section or a liquid in each section. If the one fluid is a gas and the other a liquid, then the copper plate 25.1 must be configured asymmetrically and in such a manner that the cross section thereof is less toward the section through which the liquid flows so that the coupling to both fluids is the same. The arrangement of FIG. 5*b* is operated with alternate fluid flows in the manner of the arrangement of FIG. 5*a* so that the temperature sensor 18 is subjected only to the influence of one fluid and then only to the influence of the other fluid. The fluids can be the gases delineated above for FIG. 5*a* or at least one of the fluids can be a liquid such as cooling water or the oil circulated continuously in a servo-conduit system, for example, the oil for the power steering.

The embodiment of FIG. 5*c* is distinguished from that of FIG. 5*b* only in that the coupling to one conduit section (here, the section A2 through which the second fluid FL2 flows) is poorer than to the other section A1. This is represented by a reduction in cross section of the copper plate 25.2. The arrangement with this configuration is so operated that the conduit section A1 with the fluid FL1 belongs to that conduit system for which the operability is to be checked. The fluid FL1 is coupled well to the temperature sensor 18. For fluid FL2, a fluid is selected having a very constant temperature such as the cooling water or the oil in a servo system. On the other hand, fluid FL2 can, for example, also be ambient air with the second conduit section A2 being so arranged that ambient air continuously flows therethrough.

It is understood that the foregoing description is that of the preferred embodiments of the invention and that various changes and modifications may be made thereto without departing from the spirit and scope of the invention as defined in the appended claims.

What is claimed is:

1. A method for checking the operability of a first conduit system of a motor vehicle conducting a first fluid flow at a first temperature, the method comprising the steps of:

providing a temperature sensor for detecting the temperature of said first fluid flow;

directing a second fluid flow having a second temperature to said temperature sensor with said second temperature being different from said first temperature;

adjusting the operative effect of said second fluid flow on said temperature sensor in such a manner that this operative effect is less than the operative effect of said first fluid flow when said first fluid flow is caused to operate on said temperature sensor;

directing said first fluid flow to said temperature sensor and measuring the temperature at said temperature sensor to obtain a second temperature value;

determining the temperature gradient between said first and second temperature values measured by said temperature sensor;

determining a value of a variable from said temperature gradient with said variable being dependent upon said temperature gradient;

comparing said value of said variable to a pregiven value of said variable; and, determining said conduit system as being no longer completely operable when said determined value of said variable and said pregiven value satisfy a pregiven condition.

2. The method of claim 1, wherein said temperature sensor is thermally coupled to said second fluid flow so as to provide a weak transfer of heat and is thermally coupled to said first fluid flow so as to provide a strong transfer of heat; and, said second fluid flow is directed to said temperature sensor continuously.

3. The method of claim 1, wherein said temperature sensor is thermally coupled to both said first and second fluid flows to provide substantially the same heat transfer and wherein said first and second flows are selectively operated.

4. The method of claim 1, wherein said first and second fluid flows are alternately directed to said temperature sensor.

5. The method of claim 1, wherein said temperature sensor is first brought to a temperature with the aid of both said first and second flows which is closer to said second temperature than to said first temperature and then said temperature gradient is determined.

6. The method of claim 1, wherein said variable is said temperature gradient.

7. The method of claim 6, wherein said first conduit system is evaluated as being inoperable when said determined value of said variable remains below a said pregiven value.

8. The method of claim 1, wherein said variable is the flow rate of the fluid flow which flows while said gradient is determined.

9. The method of claim 8, wherein said first conduit system is evaluated as being inoperable when said determined value of said variable remains below a said pregiven value.

10. An arrangement for checking the operability of a first conduit system of an internal combustion engine, the first conduit system conducting a first fluid flow and the arrangement comprising:

sequence control means for controlling said first fluid flow so as to pass through said first conduit system intermittently;

temperature sensor means for detecting the temperature of said first fluid flow as it passes through said first conduit system;

a second conduit system for conducting a second fluid flow so as to cause said second fluid flow to thermally operate on said temperature sensor means; and, evaluation means including means for determining a temperature gradient occurring after said first flow is switched on and directed to said temperature sensor means; means for determining the value of a variable from the temperature gradient with the variable being dependent upon said temperature gradient; comparison means for comparing said value of said variable to a pregiven value of said variable; and, means for evaluating said first conduit system as being no longer completely operational when the determined value of said variable and said pregiven value satisfy a pregiven condition.

11. The arrangement of claim 10, said first and second conduit systems being separate from each other; and, said arrangement further comprising coupling means for providing a strong transfer of heat between said first conduit system to be evaluated and said temperature sensor means and a weak transfer of heat between said second conduit system and said temperature sensor means; and, said sequence control means being adapted to control only said first fluid flow intermittently and not to operate at all on said second fluid flow.

12. The arrangement of claim 10, said first and second conduit systems having a common section and said temperature sensor means being mounted in said common section; and, said control means including means for alternately conducting said first and second fluid flows through said common section.

* * * * *

UNITED STATES PATENT AND TRADEMARK OFFICE

CERTIFICATE OF CORRECTION

PATENT NO. : 5,388,558

DATED : February 14, 1995

INVENTOR(S) : Günther Plapp, Robert Entenmann and Alfred Kratt

It is certified that error appears in the above-indentified patent and that said Letters Patent is hereby corrected as shown below:

In column 5, line 62: delete "GMIN" and substitute -- G_MIN -- therefor.

In column 6, line 15: delete "GMIN" and substitute -- G_MIN -- therefor.

In column 7, line 8: delete "FRDES" and substitute -- FR_DES -- therefor.

In column 7, line 12: delete "FRACT" and substitute -- FR_ACT -- therefor.

In column 7, line 16: delete "FRDES" and substitute -- FR_DES -- therefor.

In column 7, line 21: delete "FRACT" and substitute -- FR_ACT -- therefor.

Signed and Sealed this

Twenty-fifth Day of April, 1995

Attest:

BRUCE LEHMAN

*Attesting Officer*

*Commissioner of Patents and Trademarks*